United States Patent [19]

Hemming

[11] Patent Number: 4,890,190
[45] Date of Patent: Dec. 26, 1989

[54] METHOD OF SELECTING OPTIMUM SERIES LIMITING RESISTANCE FOR HIGH VOLTAGE CONTROL CIRCUIT

[75] Inventor: Dale R. Hemming, Fridley, Minn.

[73] Assignee: Graco Inc., Minneapolis, Minn.

[21] Appl. No.: 281,651

[22] Filed: Dec. 9, 1988

[51] Int. Cl.$^4$ .............................................. B05B 5/02
[52] U.S. Cl. .................................. 361/235; 361/227; 239/3; 239/690
[58] Field of Search .......................... 239/3, 690, 692; 361/226, 227, 228, 235

[56] References Cited

U.S. PATENT DOCUMENTS

| 2,879,395 | 3/1959 | Walkup | 250/49.5 |
| 3,912,989 | 10/1975 | Watanabe | 361/229 |
| 4,000,443 | 12/1976 | Lever | 361/228 |
| 4,120,015 | 10/1978 | Haller | 361/235 |
| 4,165,022 | 8/1979 | Bentley et al. | 361/235 |
| 4,196,465 | 4/1980 | Buschor | 361/235 |
| 4,290,091 | 9/1981 | Malcolm | 361/226 |
| 4,377,838 | 3/1983 | Levey et al. | 361/235 |
| 4,485,427 | 11/1984 | Woodruff | 361/235 |
| 4,491,276 | 1/1985 | Reeves | 361/228 |
| 4,517,618 | 5/1985 | Frank | 361/58 |

Primary Examiner—A. D. Pellinen
Assistant Examiner—Jeffrey A. Gaffin
Attorney, Agent, or Firm—Paul L. Sjoquist

[57] ABSTRACT

A method of selecting the optimum value for a series limiting resistor in conjunction with a high-voltage power supply of the Cockcroft-Walton type, wherein the high-voltage circuit is used to deliver an electrostatic field in a volatile atmosphere of the type associated with paint spraying systems.

2 Claims, 2 Drawing Sheets

METHOD OF SELECTING OPTIMUM SERIES LIMITING RESISTANCE FOR HIGH VOLTAGE CONTROL CIRCUIT

BACKGROUND OF THE INVENTION

The present invention relates to high-voltage control circuits; more particularly, the invention relates to a circuit for use in conjunction with an electrostatic paint spray gun or the like, to regulate the voltage and ionization current so as to prevent hazardous ignition.

Electrostatic field generation systems have long been used in the art of pant spraying in order to obtain control over the quantity and quality of coating material which is applied to an article. Such systems typically operate with the article to be coated placed at an electrostatic ground voltage potential, with the electrostatic spray coating apparatus, or portions thereof, being elevated to voltage potentials typically exceeding 60,000 volts (60 Kv). In the early design of such systems, a high-voltage generating system was typically placed remotely from a spray gun, and the high voltage generated thereby was conducted to the spray gun via an insulated, high-voltage cable. The voltage was conducted through the spray gun, and the high-voltage field was generated via a needle electrode proximate the front of the spray gun, wherein the sprayed particles emitted from the spray gun would pass into and through the electrostatic field. The sprayed particles thereby achieved an electrostatic voltage charge which created an attractive force to assist conveying the particles to the grounded article. The value of such systems was apparent in the overall reduction in overspray, because a high percentage of the sprayed particles would become applied to the article itself.

More recent designs for electrostatic spray coating systems have incorporated parts of the high-voltage generating system into the spray gun body itself. For example, U.S. Pat. Nos. 3,731,145, 3,599,038, and 3,608,823 show electrostatic spray coating systems wherein a voltage multiplier is incorporated into the spray gun body, and a low-voltage external power supply provides a relatively low voltage through a wire connected to the spray gun. Such systems have the advantage of eliminating the bulky high-voltage cable coupled between the external power supply and the spray gun, and of reducing the overall size of the power supply requirements for any given electrostatic voltage delivery system.

The most recent improvements in electrostatic spray systems involves the use of an electrostatic spray gun wherein the high-voltage power supply is wholly incorporated within the spray gun body, thus requiring no external wires or power supplies. Such systems are described in U.S. Pat. Nos. 4,290,091 4,377,838 and 4,491,276, which utilize air as an energy source for driving a miniature air turbine contained within the spray gun body. The air turbine in turn drives a generator for developing a relatively low alternating current (AC) voltage, which is coupled into a voltage multiplier circuit for generating the necessary high voltage.

All of the foregoing systems use a capacitor-diode voltage multiplier system, commonly known as a Cockcroft-Walton circuit, wherein a series of cascaded capacitors and diodes are interconnected to form a full-wave voltage doubler, using as many stages as are required to derive the necessary high output voltage from a given low AC input voltage.

It has been a recurring problem in the prior art to develop such high-voltage electrostatic spray coating systems wherein the hazards of fire or explosion are eliminated or at least minimized. The problem arises particularly when volatile spray coating materials are used, such as paints having volatile solvents, coupled with circuits capable of delivering an electrostatic voltage discharge. The energy of an electrostatic voltage discharge may be sufficient to cause ignition of the solvent vapors associated with the spray coating material, which may result in a flash fire or explosion. The condition of a voltage discharge has been noted to occur shortly after a sudden and rapid increase in the high-voltage power supply current, which current is known as the ionization current from the high-voltage electrode.

Some prior art devices have been proposed to solve this problem by limiting the maximum ionization current which is available from the electrode, by the inclusion of a series resistor with the power supply, so as to reduce the electrode voltage directly proportional to the magnitude of the ionization current. Other prior art designs have sought to solve the problem by utilizing various forms of control circuits, the effect of which is to either shut off the electrostatic high-voltage power supply at certain predetermined ionization current levels, or to create a current load line which is not permitted to exceed a critical ionization current level. The critical ionization current level; namely, the ionization current which is required to initiate a voltage discharge, is reasonably predictable for a spray coating system.

A technical report entitled "Investigation of Minimum Corona-Type Currents for Ignition of Aircraft Fuel Vapors," by M. M. Newman and J. D. Robb, published by the National Aeronautics and Space Administration (NASA) as NASA Technical Note D-440, June 1960, has reported that the minimum corona-type current which was sufficient for the ignition of certain aircraft fuels is about 220 microamperes. This report concerned test results for tests on aviation gasoline, various jet engine fuels, under various conditions of temperature and ignition. Although the critical ionization current level is somewhat affected by atmospheric conditions such as temperature humidity, it is believed that the critical ionization current of about 230 microamps may cause ignition of solvent vapors associated with paint spraying, under most operating conditions.

SUMMARY OF THE INVENTION

The present invention comprises a method for designing and constructing a high-voltage circuit of the Cockcroft-Walton type, so as to permit the optimum selection of series resistance for use in conjunction with this type of circuit, for maximum efficiency in power consumption, while remaining at or below a critical ionization current level. The method is adaptable for any generalized Cockcroft-Walton circuit, wherein the peak-to-peak voltage is known and the number of stages of voltage multiplication are known, and the short circuit current through the high-voltage circuit is known or may be measured. The method enables selection of a series resistance which is optimum for a Cockcroft-Walton circuit having the foregoing known parameters, so as to contain ionization current levels below a predetermined critical current level, which predetermined current level is less than that current required for ignition of solvent vapors and the like.

BRIEF DESCRIPTION OF THE DRAWINGS

The foregoing invention will become apparent from the following specification and claims, and with reference to the appended drawings, in which:

DESCRIPTION OF THE PREFERRED EMBODIMENT

Figure 1:
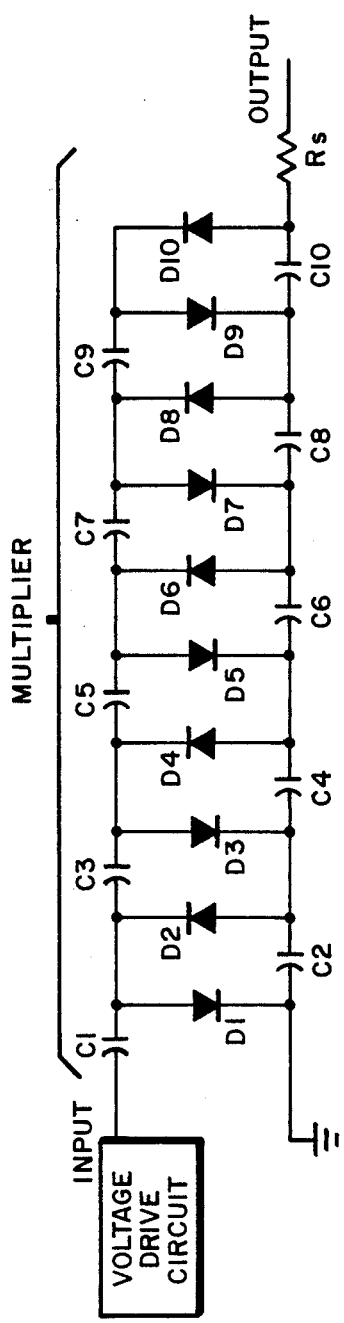
FIG. 1 shows a representative Cockcroft-Walton voltage-multiplier circuit.

FIG. 1 shows a typical and representative Cookcroft-Walton circuit of the type frequently used in the construction of electrostatic spray equipment. The circuit includes a multiplier portion consisting of a series of capacitors and diodes, wired as successive voltage doublers, in a number of stages N. In the example of FIG. 1, the number of stages N equals 10. The circuit also includes an output resistance Rs which may or may not be found in circuits associated with electrostatic spray equipment. The subject of this invention is to describe a method for selecting the optimum value for the resistance Rs under certain predetermined operating conditions. The circuit of FIG. 1 has an alternating input voltage applied to the "input" terminal, which voltage is typically designated by its peak-to-peak value (Vp-p). The circuit has an output voltage which may be measured at the terminal labeled "output," which is a direct current (DC) voltage typically measured in kilovolts. In addition thereto, there is a direct current (DC) flow through the circuit to the "output," which current is known as the "ionizing current," which produces the supply of free electrons to charge the atmosphere and paint particles that are emitted proximate the "output" terminal. The current flow is typically measured in the microamp range, and it has been determined through prior studies that this current flow must be carefully controlled in order to avoid the danger of ignition, particularly when the particles emitted in conjunction with the electrostatic power supply are volatile particles. In the case of paint spraying equipment, the emission of paint and solvent particles is highly volatile, and therefore the current flow through the circuit must be contained below a certain critical value, which value has previously been determined to be in the range of 200–220 microamps.

Figure 2:
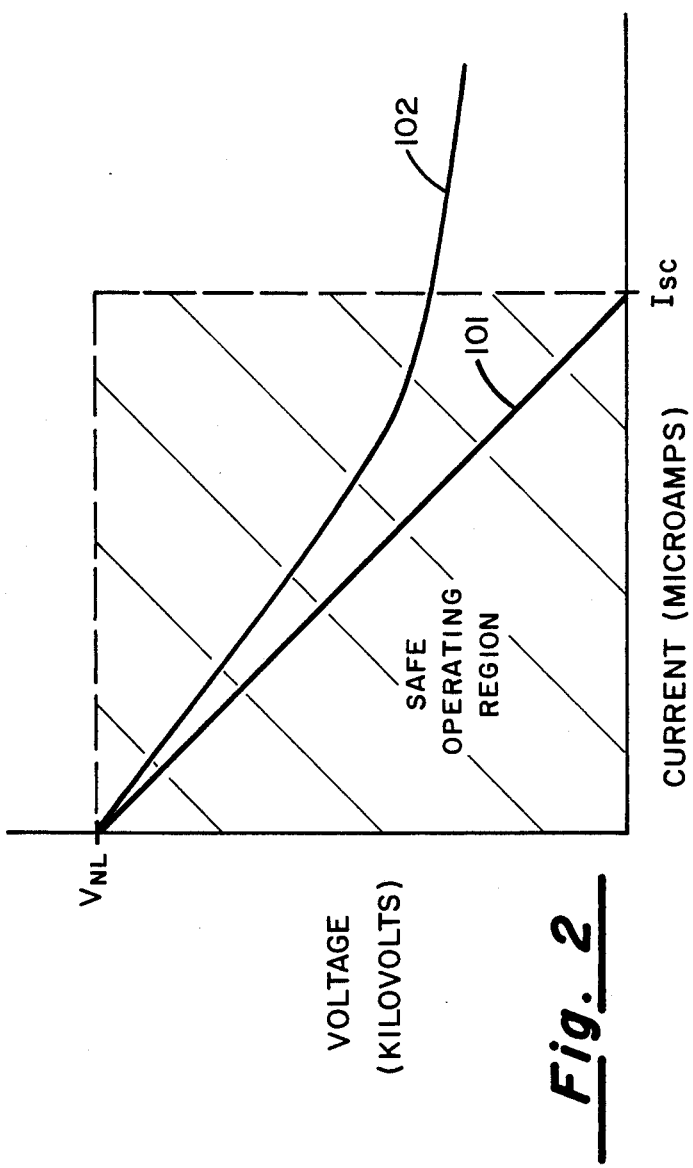
FIG. 2 shows a graph of several load lines.

FIG. 2 shows a graph illustrating the current-voltage relationship in a typical paint spray equipment application, under several loading conditions. The shaded area of FIG. 2 illustrates the theoretical safe operating region, within which the hazard of ignition and explosion is minimized. If the current and voltage operating parameters can be kept within the shaded region in paint spray equipment, there is very little likelihood of ignition as a result of spraying materials having the usual volatility of paint materials. Line 101 shows a resistive load line, which is representative of operating conditions in a purely resistive circuit, having an applied voltage of Vn1 and having a short circuit current value of Isc. Line 101 therefore represents a resistive load line which would permit operating spray equipment wholly within the safe operating region.

Line 102 is a load line which is representative of the voltage-current characteristics through a multiplier as illustrated in FIG. 1. The dynamic impedance characteristics of such a multiplier result in a nonlinear relationship between voltage and current, as is illustrated by line 102. If the load line 102 were representative of the circuit in a typical electrostatic spray gun environment, and further if the current value Isc were indicative of the maximum current value permitted for safe operation, then it is apparent that load line 102 would be unsatisfactory for use without hazard. Line 102 indicates that ionizing current levels well beyond the maximum safe current level are possible if only the multiplier portion of the circuit of FIG. 1 were designed into a spray gun.

The general effect of adding the resistance Rs in series with the multiplier circuit of FIG. 1 is to straighten out the load line 102 and to shift it generally downward toward the safe operating region. It has been determined that there is a predefined relationship between the value of Rsc and the other operational values associated with the circuit of FIG. 1, as determined by the following equation:

$$Rsc = \frac{Vp-p\,(XN-1)}{12\,Isc}$$

In the foregoing equation the value Vp-p is the peak-to-peak voltage applied at the "input" of the circuit of FIG. 1; the value N is the number of stages of voltage doublers found in the circuit; the value Isc is the maximum short circuit current permitted for safe operating conditions; the value X is an arbitrary value which may be assigned to the equation to reposition the load line.

Figure 3:
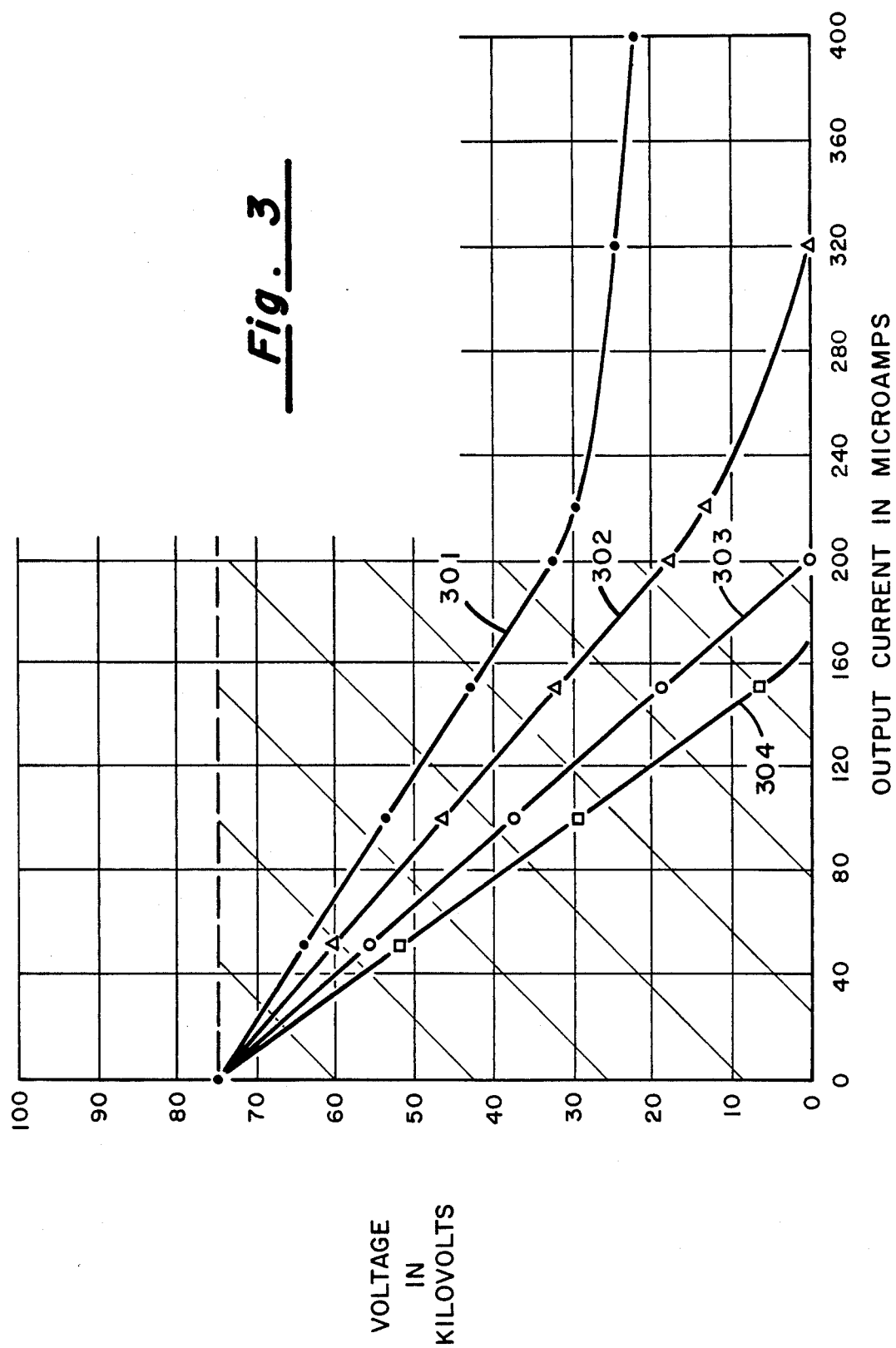
FIG. 3 shows a graph of several load lines associated with the invention.

FIG. 3 illustrates a graph showing various load line positions, as determined by applying various values X to the foregoing equation. Load line 301 is identical to load line 102 of FIG. 2, which is the representative load line of the multiplier portion of the circuit of FIG. 1, with no series resistance Rs included in the circuit. Load line 302 represents the resulting shift of the load line 301 when a value for X is chosen to be 2. In this case, it is apparent that load line 302 would still produce operating conditions which are out of the safe operating region. Load line 303 results when the value of X is chosen to be 4, which results in a nearly straight line, yielding the maximum current of 200 microamps. Load line 304 illustrates the load line which results when the value for X is chosen to be 6, which also produces a nearly straight load line within the safe operating region.

The graph of FIG. 3 illustrates that as the value of X is increased, the resulting load line shifts downwardly toward and into the safe operating region. The graph also illustrates that the value of X of equaling 4 or greater is sufficient to constrain operation entirely within the safe operating region.

However, the penalty which must be paid as the value of Rs is increased, is an increase in power consumption in the electrostatic circuit. It is therefore preferable to select the smallest value for Rs which is consistent with operation entirely within the safe operating region. It is apparent from FIG. 3 that this is achieved by the load line 303, which itself is created by selecting a value for X equal to 4. Therefore, the foregoing equation is optimized and may be restated as follows:

$$Rs = \frac{Vp-p\,(4N-1)}{12\,Isc}$$

In operation, the value selected for Rs is determined by measuring the peak-to-peak voltage (Vp-p) to be applied to the input of the multiplier circuit, and then to determine the number of stages of multiplication which are incorporated into the voltage multiplier circuit. The value Isc is somewhat dependent upon the type of paints and solvents to be used in connection with the electrostatic spray gun under consideration, but it typically lies in the range of 200–220 microamps. For a reasonably safe operating condition the value Isc should be set equal to 200 microamps. If these values are then inserted into the foregoing equation the value for Rs is readily determined, and a resistance of this magnitude should be inserted in series arrangement with the voltage multiplier circuit.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of constructing a high-voltage power supply having a circuit of the Cockcroft-Walton type, having optimum design for limiting output current flow to minimize electrostatic voltage arcing at the output, in a volatile atmosphere, comprising the steps of
    (a) selecting a voltage drive circuit having a predetermined peak-to-peak voltage output and connecting same to the input of said Cockcroft-Walton circuit;
    (b) selecting a predetermined number of voltage multiplication stages for said Cockcroft-Walton circuit; and
    (c) connecting a resistor in series with the output of said Cockcroft-Walton circuit, said resistor having a value determined by
        (i) dividing the predetermined peak-to-peak voltage by $2.4 \times 10^{-3}$, and
        (ii) multiplying the result of step i) by one less than 4 times the predetermined number of voltage multiplication stages.

2. A high-voltage power supply, comprising
    (a) a Cockcroft-Walton type circuit having a predetermined number of voltage multiplication stages, an input and output;
    (b) a voltage drive circuit having a predetermined peak-to-peak voltage output connected to said Cockcroft-Walton circuit input; and
    (c) a resistor connected to said Cockcroft-Walton circuit output, said resistor having a resistance value determined by dividing said predetermined peak-to-peak voltage by $2.4 \times 10^{-3}$, and multiplying the result by a value which is one less than four times said predetermined number of voltage multiplication stages.

* * * * *